United States Patent [19]

Peyrot

[11] 4,216,365

[45] Aug. 5, 1980

[54] MACHINE FOR WELDING PROVIDED WITH A ROTARY PLATFORM

[76] Inventor: Jean-Pierre Peyrot, 8 Domaine du Bel Abord, 91380 Chilly Mazarin, France

[21] Appl. No.: 944,231

[22] Filed: Sep. 20, 1978

[30] Foreign Application Priority Data

Sep. 20, 1977 [FR] France ............................... 77 28336

[51] Int. Cl.² ............................................. B23K 9/02
[52] U.S. Cl. ............................ 219/60 A; 219/125.11
[58] Field of Search .......................... 219/60 A, 125.11

[56] References Cited

U.S. PATENT DOCUMENTS

4,038,509   7/1977   Henderson ...................... 219/60 A

*Primary Examiner*—Elliot A. Goldberg
*Attorney, Agent, or Firm*—Sprung, Felfe, Horn, Lynch & Kramer

[57] ABSTRACT

A machine for the automatic welding of circular assemblies, comprising a fixed frame provided with means for receiving and holding an assembly to be welded, a welding-platform rotatively mounted on said frame, a drum rotatively mounted on said fixed frame about an axis parallel to the axis of said platform, a first and second spools constituted by a portion of said platform and of said drum, respectively, means for feeding the welding torch, sheaths for guiding said feeding means, one end of each sheath being fixed to said drum while its other end is fixed to said platform, and means for rotatively driving said platform and drum simultaneously.

3 Claims, 16 Drawing Figures

MACHINE FOR WELDING PROVIDED WITH A ROTARY PLATFORM

The present invention relates to a rotary welding platform adapted to achieve circular weldings on tubes arranged end-to-end in various manners. Most of commercial installations require metal conduits for the transfer of fluids, which necessitates joining end-to-end, or butting together, a large number of tubes, or of tubes and flanges, by means of welds.

Such welds can have various configurations:
either welds between tubes arranges end-to-end, the welding-torch being at right angles to the generatrices of said tubes,
or welds between tubes (or tubes and flanges) fitted end-to-end into one another, the welding-torch being inclined with respect to the generatrices of the tubes.

Moreover, the tubes can have various diameters. It is requested, accordingly, to provide for a radial adjustment of the welding-torch, together with an axial adjustment and an angular adjustment of said torch.

In addition, such a welding platform has obviously to be concentric with the welding to be made, with an accuracy within ±1/10 millimeter.

A number of apparatuses of this type have been put in the market for several years; now, such apparatuses are relatively cumbersome and uneasy to handle with respect to the tubes to be welded.

One of the objects of the present invention is to improve the technology of installations for butting tubes together by automatic welding, first by improving the reliability thereof, and secondly by reducing their overall size so as to render them small and easy to handle.

Another object of the invention is to provide a suitable welding-tool with interchangeable cooled torches which can be adjusted to suit various welding-joints.

Still another object of the invention is to simplify the cycle of operating-steps in the case of mass-production while providing reproducible welds.

According to the invention, a machine for the automatic welding of circular assemblies comprises a fixed frame provided with means for receiving and holding an assembly to be welded, in particular two tubes to be welded end-to-end, such means being per se of a conventional type. On said fixed frame are mounted side-by-side a welding-platform, on the one hand, and a drum, on the other hand, so as to be able to rotate about their respective axes which are parallel to each other.

In the welding-platform is provided a housing for allowing the passage of the tubes of the assembly, such housing forming a through cavity from one face of the platform to the other in the axial direction. As seen in cross-section at right angles to the rotation axis, said housing is U-shaped, viz. open up to the platform periphery over a width equal to the diameter of said axial housing, thus giving the cross-section of the platform the shape of a horseshoe. This housing thus permits to mount the assembly along the platform axis when said platform has been brought to a position at which the housing opening is in alignment with that of the fixed frame.

In addition, said platform carries a welding-torch, adjustable at least radially so as to suit tubes having various diameters and angularly according to the weld to be made, and, contingently, a filler-metal feed device as well as one or several guiding rollers resiliently resting on the tubes. Means for feeding the welding-torch are connected, on the one hand to the torch by means of couplings which are steady with respect to said torch and, on the other hand to conduits, leads or other fixed sources, by means of rotaty couplings in the vicinity of the rotary drum. Said feeding means comprise conduits or leads passing through, or mounted along, guiding sheaths the extremities of which are fixed to the drum and to the platform respectively, and are wound in the same direction about the above two take up reels. In order to allow the torch to be moved while the welding-joint is being made, means are provided for rotatively driving said platform and drum simultaneously in either direction. More specifically, an endless belt is in mesh with a crown-gear of the platform, with a crown-gear of the drum and with a driving pinion, and said belt forms re-entrant loops about said three members. In addition, it is guided by idle wheels about which it also forms re-entrant loops. Moreover, resilient return means are provided for permanently maintaining the belt taut, so as to offset the distorsion undergone by said belt when passing above the platform U-shaped opening, said distorsion being due to the fact that the platform crown-gear, of generally circular shape, is interrupted at that place.

The invention will be more clearly understood with reference to the accompanying drawing and to the following description.

Figure 1:
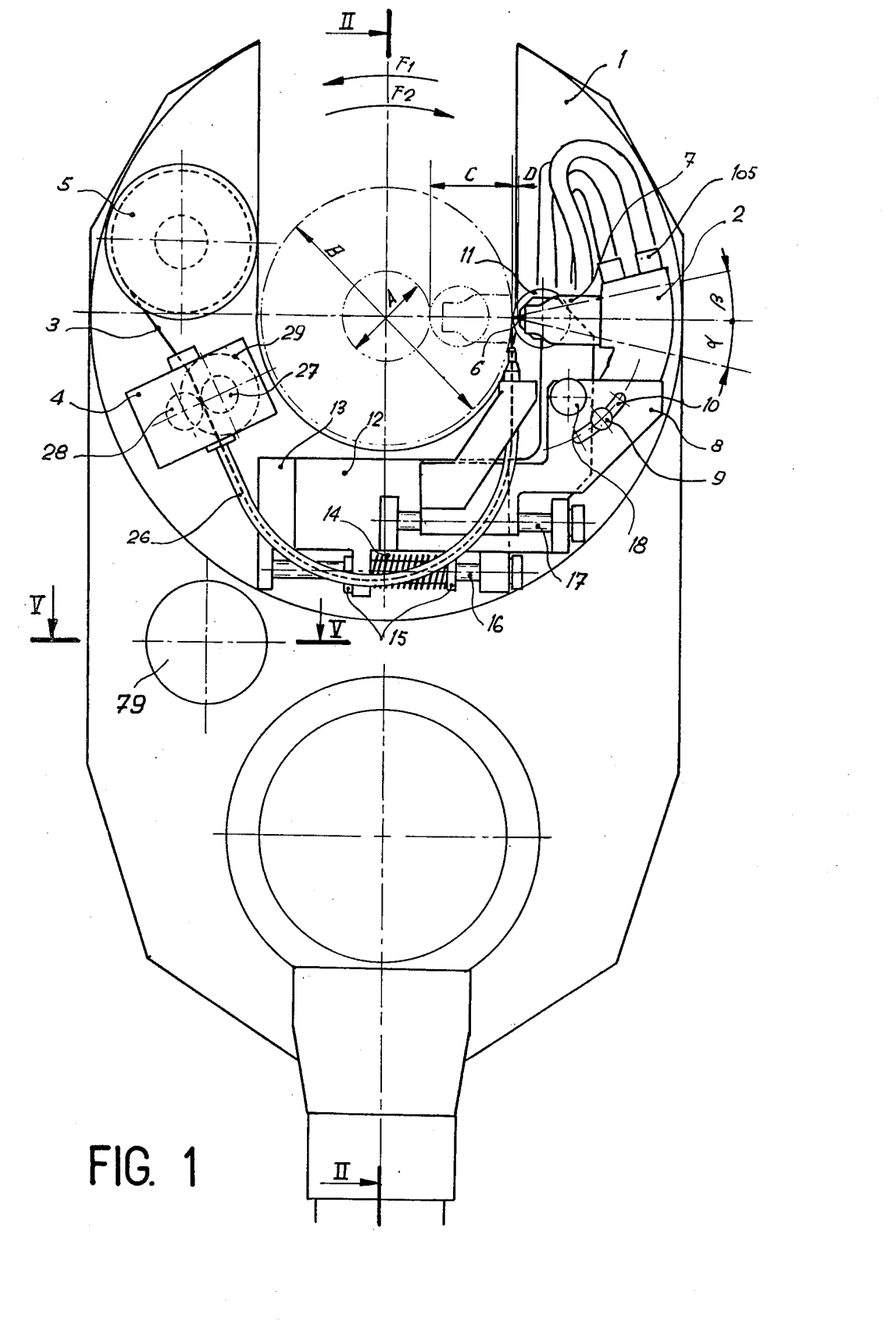
FIG. 1 is a front view of the whole device and, more especially, of the rotary platform to which are fixed the torch with adjustment members therefor, as well as the device for unwinding the filler wire and its magazine.

The installation comprises rotary platform 1 to which are attached torch 2 with its adjustment devices, filler-wire 3, device 4 for unwinding said wire and its magazine or feed spool 5. This installation permits to carry out the orbital welding of a wide variety of tubes with diameters ranging from A to B. The space occupied by the installation varies, of course, according to the diameter range selected. Torch 2 is conventionally constituted by a metal body through which the cooling water flows, an inlet channel for protective gas (viz. the fluids fed to connections 105), a tungsten electrode 6, an electrode clip, a gas diffuser and a protective nozzle 7 of ceramics. The torch body is coated with a highly resistive substance. The torch is fixed to a supporting member 8 by tightening a screw 9 integral therewith; said torch can be adjusted according to angles and by moving screw 9 along port 10 of support member 8. Roller 11, which rolls along the tube outer periphery while platform 1 is caused to rotate, is carried by a carriage 12 moving along a track 13 integral with platform 1.

Figure 7:
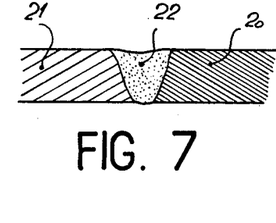
FIG. 7 is a cross-section of the wall of a tube-assembly welded, without filler metal.
Figure 8:
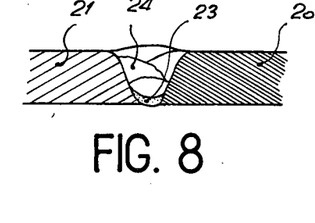
FIG. 8 is a cross-section of the wall of a tube-assembly welded, with filler metal.

Said roller 11 is permanently compressed against the tube and follows the irregularities of the latter within one tenth of an inch or so under the action of a spring 14 compressed between carriage 12 and a bolt 15 screwed on a screw 16 which is integral with track 13. According to the diameter of the tube to be welded and in order to maintain the tube-following function of roller 11, one moves the latter by actuating screw 16, which imparts a movement of translation to bolt 15. The displacement of that set of parts radially of the tube can reach a miximum value C. Into support member 8 of the torch is screwed a screw 17, that is, in turn, maintained in carriage 12. The function of said screw 17 is threefold, viz.: (a) during the welding step, maintaining the torch at a given fixed position with respect to the follower-roller; (b) adjusting spacing D (viz. the length of the welding-arc kept constant within ±1/10 millimeter during the welding step), and (c) acting in the manner of an articulation for torch-support 8, in order to move electrode 6 by amounts G and H. The latter two adjustments are achieved by actuating a screw 18 resting on carriage 12 and screwed into torch support 8. Such an adjustment permits to set the position of the electrode with great accuracy in the junction plane 19 of two tubes 20, 21, arranged end-to-end, when it is desired to weld said tubes to each other without filler-metal, either as at 22 (FIG. 7) or as at 23 (FIG. 8). It can be easily understood why the electrode should be accurately set in the junction plane 19 when the installation is rigidly fixed to tube 21. In addition, one resorts to adjustments G and H alternatively in the case of weldings with a filler metal in order to provide the various filling passes 24.

Filler-wire 3 is brought towards the electrode by means of a guiding-nozzle 25 integral with torch-support 8, said nozzle being extended by a flexible tubular sheath 26 attached to unwinder-device 4. The latter contains two knurled rollers 27, 28, adapted to compress filler-wire 3, said rollers being rotatively driven by a motor 29. Such an arrangement permits to extract the filler-wire from its magazine, or feed-drum, 5, and pushes it towards the torch. Those weldings without filler metal are made in the direction F1 of rotation of the rotary platform, whereas those with a filler metal are made in the direction F2.

Figure 2:
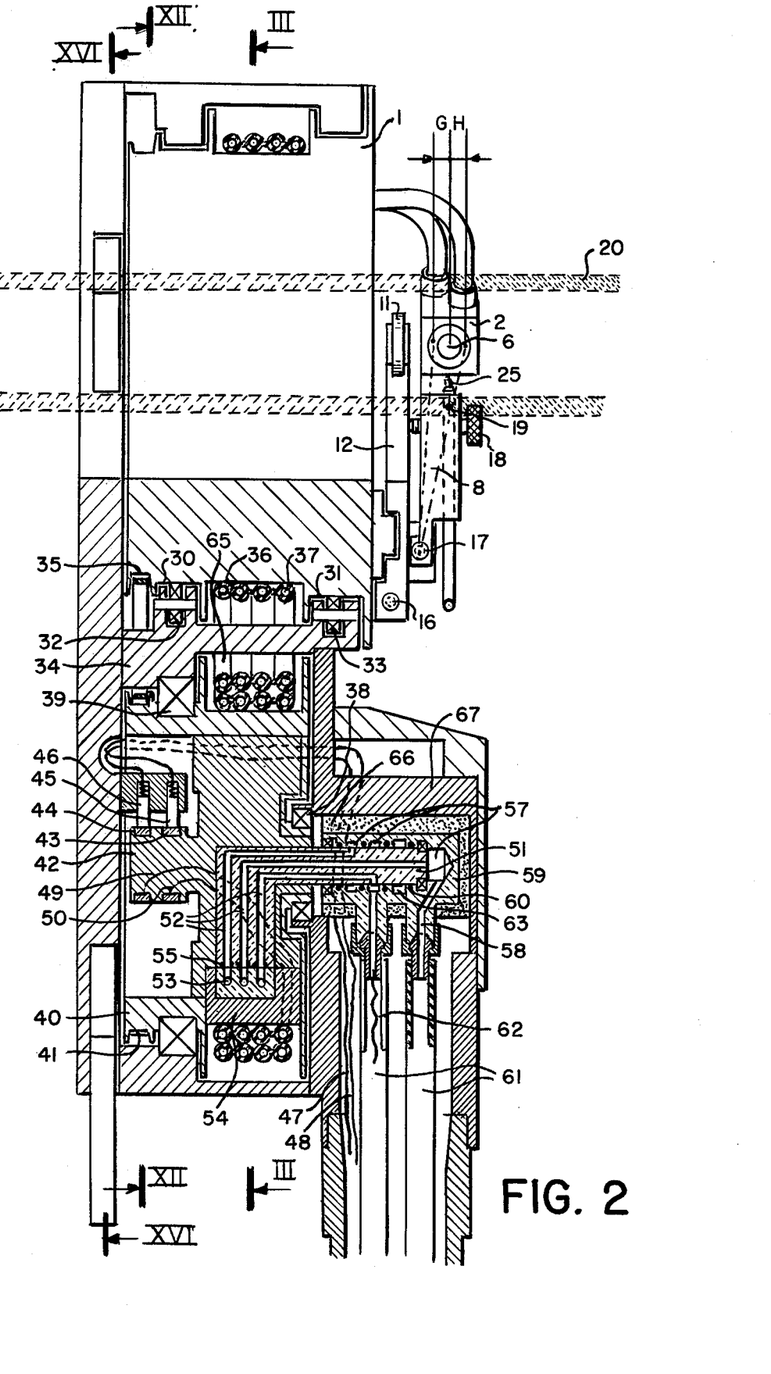
FIG. 2 is a cross-section of the whole apparatus along line II—II of FIG. 1, showing the rotary platform, the take-up reels, the multi-conduit sheath as well as the steady portions and the rotary portions of the fluid manifold, all in cross-section.

The number of revolutions of the torch does not exceed two. On FIG. 2 are shown, in cross-section, the rotary platform, as well as the fixed portions and the rotary portions of the fluid manifold. Platform 1 is guided by two rolling tracks 30, 31, resting on two series of several rolling-members 32, 33, mounted in circular fashion in fixed frame 34. In its rear portion, the rotary platform contains a crown-gear 35, the latter being a driving member belonging to the transmission system to be described later. In the middle portion thereof, said platform comprises a take-up spool 36 for a multi-conduit sheath 37, both to be described later.

Within frame 34 and beside rotary platform 1, a rotary drum 40 is centered between two bearings 38, 39, said drum carrying a toothed pulley 41 by means of which it is rotatively driven. Said drum is constituted by a metal body filled with insulating material 42. On this material are fixed two metal tracks 43, 44, against which are caused to rub two brushes 45, 46, integral with frame 34. These members constitute the collector for feeding motor 29 of the filler-wire unwinding device with low-voltage current. Said brushes are connected to the low-voltage source through leads 47, 48, and tracks 43, 44, are connected to motor 29 through leads 49, 50, crossing multi-conduit sheath 37 wound about a spool 65.

A metal block 51 is embedded in insulating material 42, said block being pierced with conduits 52 through which flow cooling water and the protective gas, respectively. Said conduits, at one end, open into orifices 53 of the metal portion 54 of the multi-conduit sheath (tightness is provided by sealing-joints 55), and, at the other end, open into grooves 57 extended by conduits 58 provided in a fixed metal part 59. The tightness of this manifold is provided by sealing-joints 60.

Figure 3:
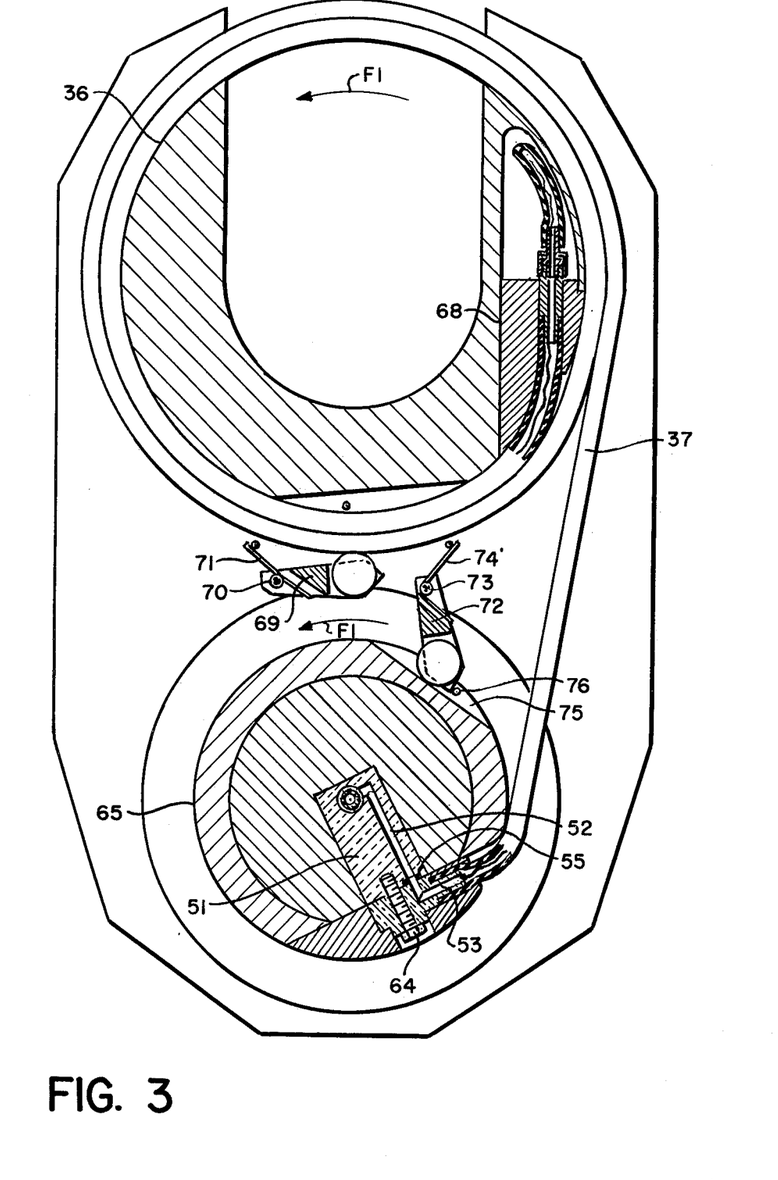
FIG. 3 is a cross-section along line III—III of FIG. 2, showing the multi-conduit sheath wound about the upper reel, and the locking-pawls, one of which locks the lower reel.

Conduits 58 are sealingly connected to flexible ducts 61 which come from a welding-current generator and through which water and gas flow. One of said ducts contains a metal cable 62 for the welding-current. A groove 63 filled with mercury transmits said current to rotary shaft 51. The passage of the welding-current from the multi-conduit shaeth and rotary drum 40 is obtained through the contact of metal parts 54, 51, said contact being improved by thoroughly tightening screw 64 (FIG. 3). Metal block 59 is maintained at a fixed position through an insulating material 66 wrapped in a metal casing 67 fixed to frame 34.

On FIG. 3 is shown multi-conduit sheath 37 attached to spool 36 at 68 and fixed to spool 65 by means of screw 64. The whole set is represented as it appears at the end of the welding operation, without filler metal, after two revolutions of the torch in the direction F1. Since the two spools are synchronised and rotate in the same direction, the sheath, previously wound about spool 65, has been unwound and taken up by spool 36.

As shown, a pawl 69 hinged about a pin 70 is forced against sheath 37 by means of a spring 71. A further pawl 72 provided with a roller is hinged about a pin 73 and pushed towards drum 65 by a spring 74.

As it is between unwound from spool 65, the sheath uncovers a housing 75 in which is fixed a pin 76 adapted to come in abutment with pawl 72, which results in locking drum 65 as well as the whole transmission system and, accordingly, protecting sheath 37, which can no longer be unwound. The stoppage of the driving means is automatically controlled, at the moment of contacting pin 76, by conventional means.

Figure 4:
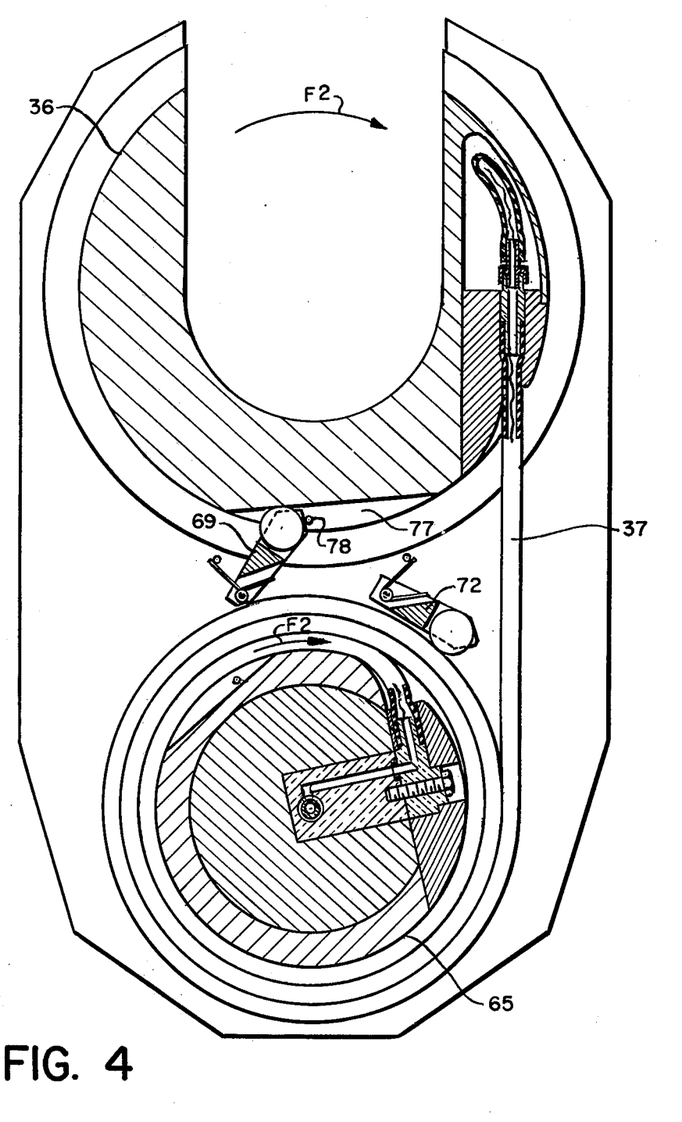
FIG. 4 is a similar cross-section, showing the multi-conduit sheath wound about the lower reel, and the locking-pawls, one of which locks the upper reel.

On FIG. 4 is shown the sheath-and-spool combination as it appears at the end of a welding operation with a filler material after two revolutions of the torch in the direction F2.

At the position shown, sheath 37 has been unwound about drum 65 and pawl 72 has been raised and rolls along the sheath; sheath 37 has been unwound from drum 36, thus uncovering housing 77 and its pin 78 against which pawl 69 has come in abutment, thus locking the whole transmission system. Prior to each welding pass with filler metal, it is necessary to make two revolutions in the direction F1 so as to position the filler-wire in front of the electrode. It is imperative, moreover, to bring the torch back to the position of end-of-welding with filler metal so as to be able to engage the rotary platform against a tube or disengage same.

Figures 5, 6:
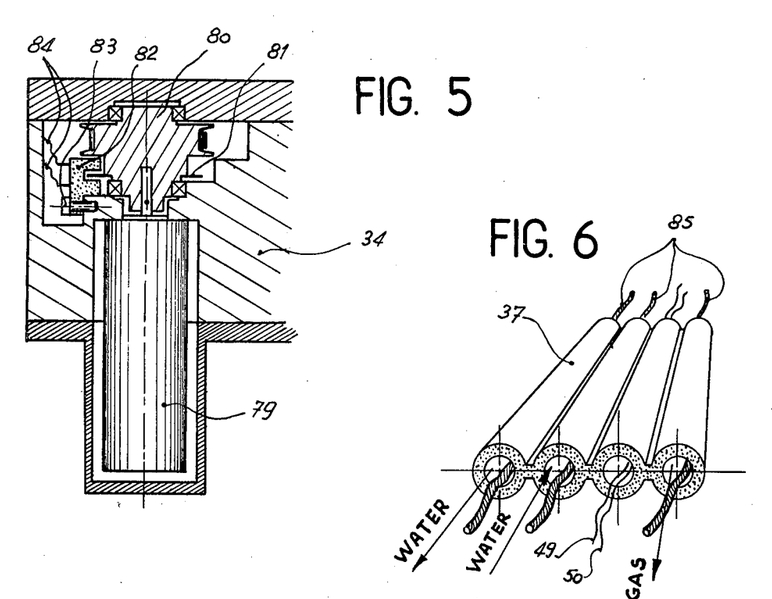
FIG. 5 represents the electric motor and the driving transmission pulley, in cross-section along line V—V of FIG. 1; also shown is a device for measuring the position and rotation speed of the torch.
FIG. 6 shows the structure of the multi-conduit sheath in cross-section.

On FIG. 5 is shown, in cross-section, the driving portion of the transmission system. Said driving portion comprises an electric-motor 79 fixed to frame 34 and adapted to actuate a toothed pulley 80 and a transparent streaked disk 81. A block 82 is fixed to frame 34 by means of a screw 83. Through said block pass electric-leads 84 connected to a microlamp and to a bip-receiving photocell, between which moves said streaked disk. The whole set of parts constitutes a device for controlling the torch position and measuring the rotation speed.

FIG. 6 is a cross-section through multi-conduit-sheath 37. The envelope is constituted by four tubular conduits of a resilient material, said material being electrically non-conductive and resistant to heat and to the U-V rays generated by the welding-arc.

Through two of said conduits flows the cooling water; the protective gas flows through a third conduit; said three conduits contain braided wires 85 conducting the welding-current; finally, no fluid flows in the fourth conduit; this latter contains leads 49, 50, which feed the motor of the filler-wire unwinding device.

Figure 9:
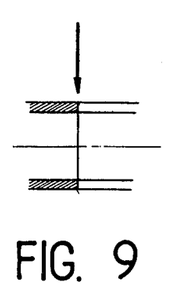
FIGS. 9, 10 and 11, show various assembly configurations.
Figure 10:
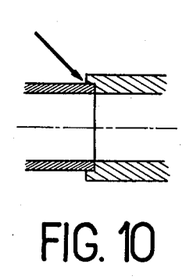
Figure 11:
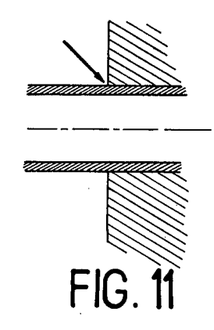

FIGS. 9, 10, 11, represent various possible weld configurations, requiring to equip the installation with suitably shaped torches.

Figure 12:
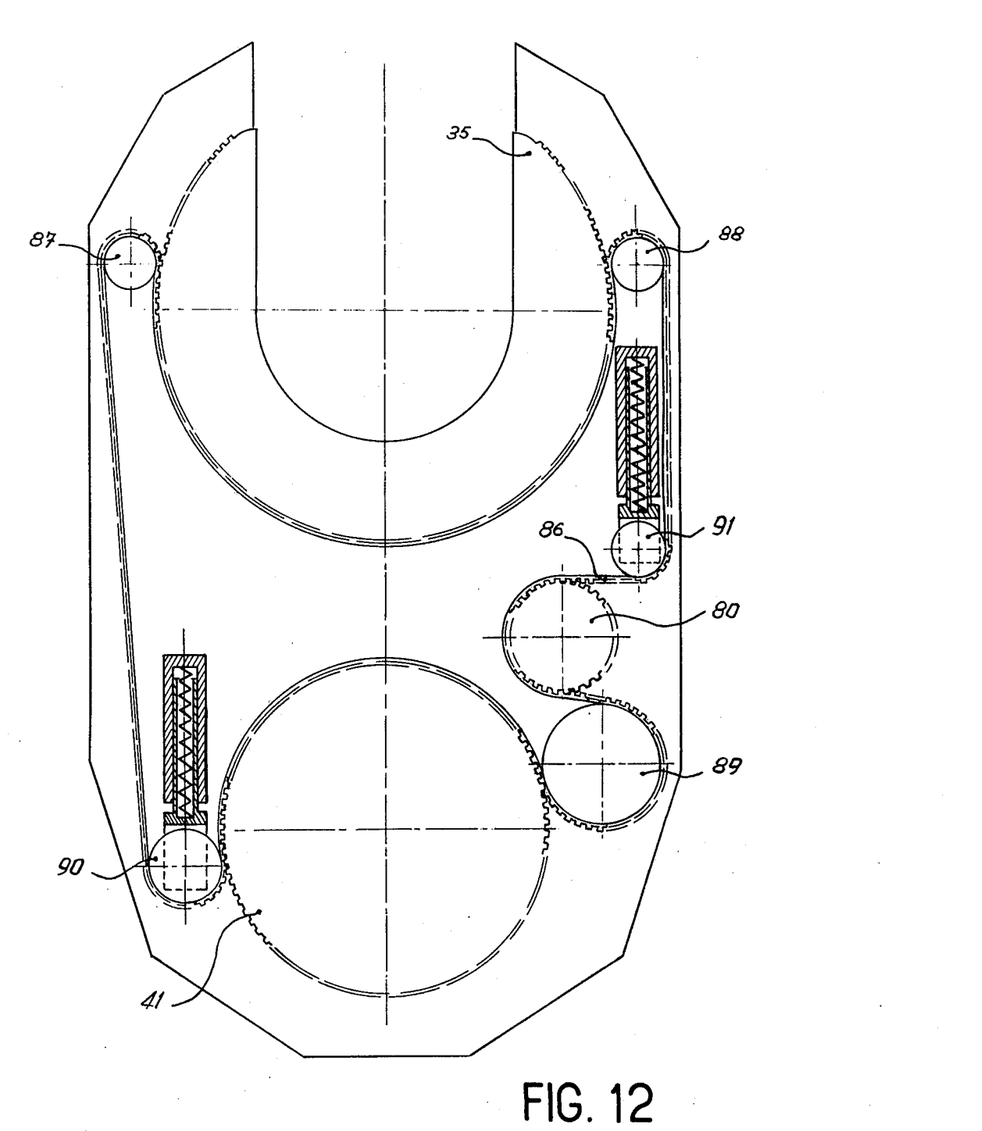
FIG. 12 is a cross-section along line XII—XII of FIG. 2, showing the principle of transmission by means of a toothed belt, at the moment when the rotary platform is being brought near the tubes or when it is being extracted, after the welding operation.

FIG. 12 represents the transmission system constituted by a toothed driving pulley 80 adapted to actuate an endless toothed belt 86. The latter, the direction of which is successively reversed by fixed smooth rollers 87, 88, 89, and tightening smooth rollers 90, 91, causes toothed pulleys 35, 41, to rotate in the same direction. Such a device permits to drive crown-gear 35 at constant speed in spite of the U-shaped opening thereof.

Figures 13, 14:
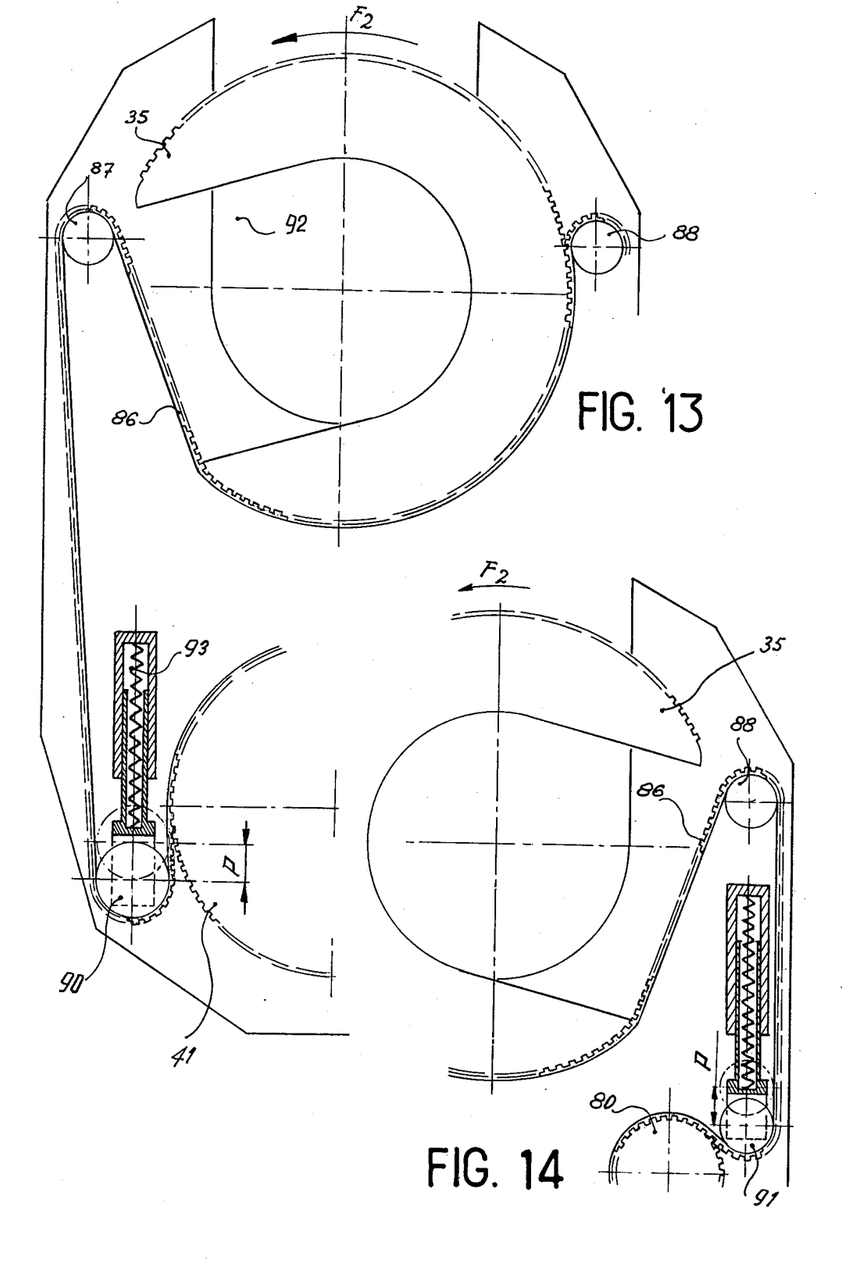
FIG. 13 represents the transmission at the moment when the open portion of the upper crown-gear releases the toothed-belt loose side, on the left.
FIG. 14 represents the transmission at the moment when the open portion of the upper crown-gear releases the toothed-belt tight side, on the right.

FIG. 13 shows pulley 35 as rotating in direction F1. As soon as the beginning of notch 92 in the pulley comes in register with roller 87, the arc along which belt 86 was taut gradually transforms into a straight line up to a length equal to that of the chord of said arc. In order to make for the distorsion, roller 90 moves downwards, under the action of compression spring 93 by an amount P equal to half the difference between said arc and chord.

Figure 15:
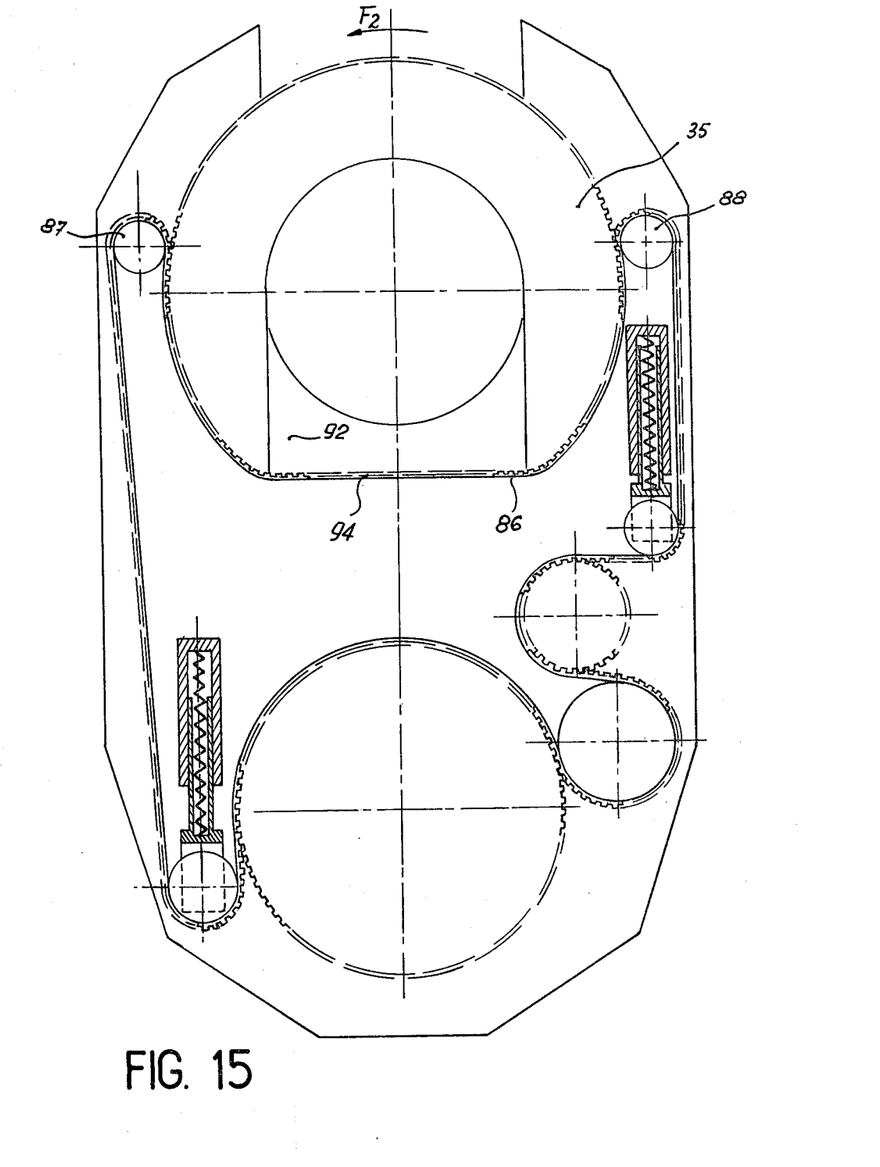
FIG. 15 represents the transmission in operation during the passage of the toothed-belt above the opening of the upper crown-belt.

On the other hand, when the end of notch 92 comes in register with roller 87, said chord is transformed into an arc and, accordingly, tightening roller 90 rises by the same amount P. Chord 94 shown on FIG. 15 is moved towards roller 88.

On FIG. 14, whenever chord 94 moves in front of roller 88, roller 91 will follow the same path as explained above for roller 90.

Figure 16:
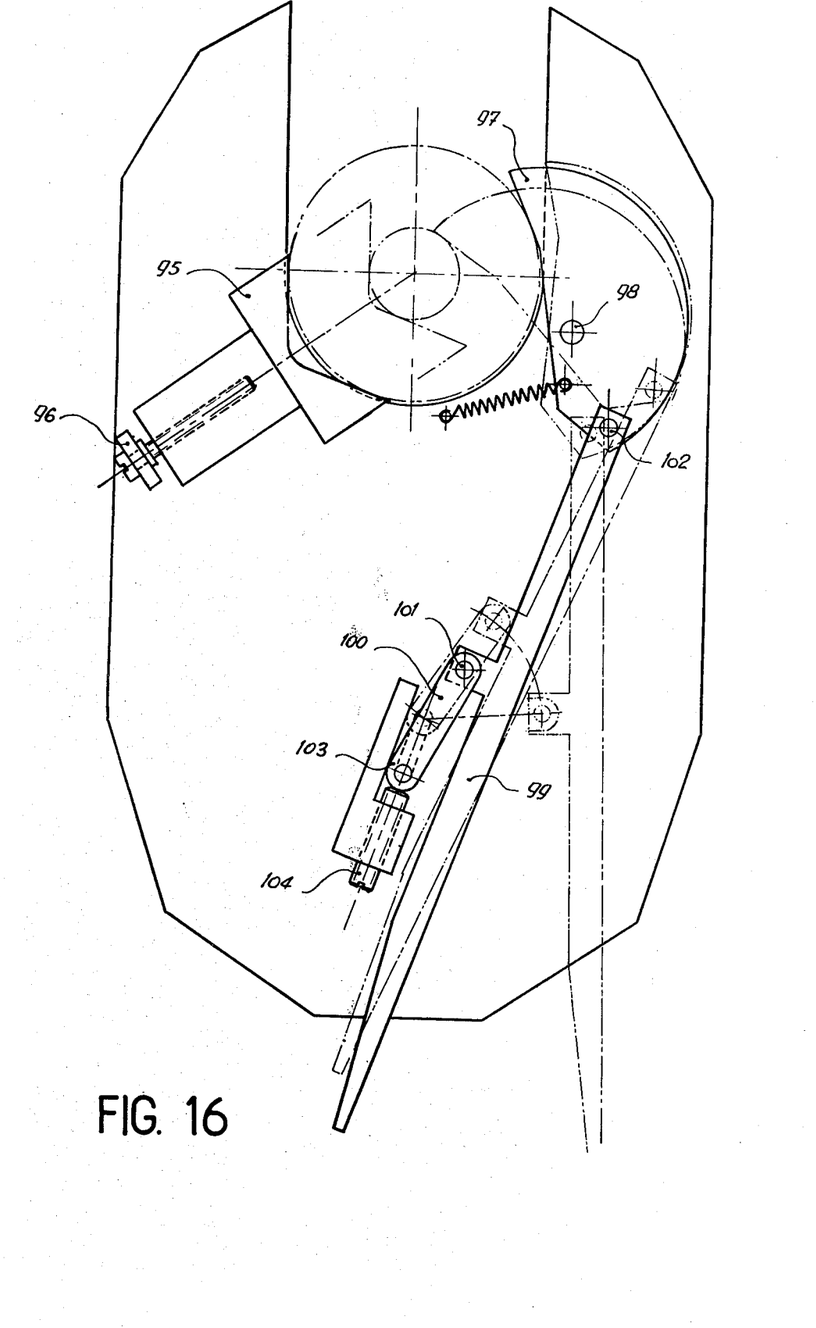
FIG. 16 represents the self-centering clamping system and its toggle-levers, in cross-section along line XVI—XVI of FIG. 2.

FIG. 16 shows the device for attaching the rotary platform to tube 21. This device comprises a V-shaped rest 95 integral with frame 34, applied against tube 21, said rest 95 is displaced by means of screw 96, in such a manner that the axes of the rotary platform and of the tube coincide. A cam 97, articulated to a pin 98 integral with frame 34 permits to tighten the tube against rest 95. Said cam has the shape shown on the figure. Two levers, 99, 100, articulated at 101, will provide the required stress and the locking of the installation, since one of them is articulated at 102 to cam 97, while the other rests, at 103, on a screw 103.

Actuation of said screw permits to suit same to the tube diameter, on the one hand, and to adjust the clamping stress, on the other hand.

In the above description, the adjustment of the arc-length is mechanically provided by a wheel which comes to rest against the parts to be welded, and no transverse scanning by the torch is described. However, the installation permits to carry out such radial and transverse movements by electro-mechanical or electro-hydraulic control, through means well known to the art: it is only sufficient, indeed, to constrain the movement of screw 16, as regards radial displacements, and of screw 18, as regards transverse displacements, to a prescribed instruction or to an order transmitted from the measurement of the welding parameters.

I claim:

1. In a machine for the automatic welding of circular assemblies:

a fixed frame provided with means for receiving and holding an assembly to be welded;

a welding-platform rotatively mounted on said frame, said platform having a horseshoe cross-section about a housing for the passage of said assembly and carrying a radially adjustable welding-torch;

a drum rotatively mounted no said fixed frame about an axis parallel to the axis of said platform;

a first and a second spools constituted by a portion of said platform and a portion of said drum, respectively;

a first and a second crown-gears formed at the periphery of said platform and of said drum, respectively;

means for feeding said torch, said means being connected to said torch by coupling-members fixed with respect to said torch, on the one hand, and to fixed sources by means of rotary coupling-members of said drum, on the other hand;

sheaths for guiding said feeding means, one end of which is fixed to said drum while the other end is fixed to said platform, said sheaths being caused to be wound in the same direction about a first take-up spool formed by said platform and a second take-up spool formed by said drum; and means for rotatively driving said platform and drum simultaneously in either direction, said means comprising an endless belt in mesh with said crown-gears of said platform and drum and with a driving pinion, about which said belt forms re-entrant loops, and guided by idle wheels about which it also forms re-entrant loops, and resilient return means for maintaining said belt taut, so as to offset the distorsions of said belt when it passes above said platform opening.

2. An automatic welding-machine according to claim 1, wherein said platform carries a spool for storing a filler-wire and a device for bringing said wire in the immediate vicinity of said torch.

3. An automatic welding-machine according to claim 1 or to claim 2, wherein said guiding sheaths have a length permitting said sheaths to form two revolutions about said platform, and devices are provided for automatically stopping said sheaths at the end of their run.

* * * * *